Sept. 8, 1964  R. A. BRENNER ET AL  3,148,144
THREE-SPEED TRANSMISSION FOR A LAUNDRY MACHINE
Filed Nov. 29, 1960  6 Sheets-Sheet 1

Fig. 1

INVENTORS
Robert A. Brenner
BY Clifton A. Cobb

Hill, Sherman, Meroni, Gross & Simpson
Attys.

Sept. 8, 1964 R. A. BRENNER ET AL 3,148,144
THREE-SPEED TRANSMISSION FOR A LAUNDRY MACHINE
Filed Nov. 29, 1960 6 Sheets-Sheet 2

Fig. 2

INVENTORS
Robert A. Brenner
BY Clifton A. Cobb
Hill, Sherman, Meroni, Gross & Simpson
Attys.

United States Patent Office 3,148,144
Patented Sept. 8, 1964

3,148,144
THREE-SPEED TRANSMISSION FOR A
LAUNDRY MACHINE
Robert A. Brenner and Clifton A. Cobb, St. Joseph, Mich., assignors to Whirlpool Corporation, St. Joseph, Mich., a corporation of Delaware
Filed Nov. 29, 1960, Ser. No. 72,449
5 Claims. (Cl. 210—144)

The present invention relates broadly to home appliances, and is more particularly concerned with an acceleration control system featuring therein a variable speed transmission incorporating friction clutch means actuated by fluid pressures to increase the speed ratio of the transmission while being responsive to reduced fluid pressures produced by sensing deflections of a substantially horizontal axis type drum caused by rotation of unbalanced loads therein.

The instant acceleration control system and variable speed transmission embodied therein find important applications in association with a fluid balancing system utilized in domestic laundry appliances, and will accordingly be described in this environment. However, as the description proceeds it will be readily apparent that the disclosed transmission has numerous uses other than in the laundry art, and as well produces advantageous results with any balancing system and method where it is desired to counterbalance unsymmetrically disposed centrifugal forces generated because of unbalance in a rotating body.

It is known that a substantial time savings in the total washing and drying time of an automatic washing machine or in a so-called combination washer-dryer can be made by shortening the dry portion of the cycle. Increasing the drying heat input to the dryer is not ordinarily regarded as desirable because of power requirements and the consequent somewhat increased cost of operation, as well as from the standpoint of engineering design considerations which are required because of the increased power input to the drying means. A practical and economical approach is accordingly to increase the rotative cylinder speed used during the extraction part of the wash cycle, to thereby remove larger amounts of water from the load prior to the beginning of the tumble drying or line drying if the load is to be hung on a line to dry. This has been found to produce power consumption rate savings of the order of eight to fifteen times, as compared with the high power input drying process to dry out moisture not removed by a low extraction cylinder speed.

However, when the load is spun in the cylinder, it is likely to be distributed in such a manner that the center of mass of the loaded cylinder does not coincide with the cylinder bearing axis. As a result, there is produced an unbalanced centrifugal force which is directly proportional to the mass of the unbalanced portion of the total rotating mass, the square of the angular velocity of such unbalanced mass, and the radius of the unbalanced mass from the axis of rotation of the cylinder. An unbalanced condition not only affects the power input necessary to rotate the cylinder or drum, but causes serious vibration conditions which are particularly pronounced in horizontal axis machines, since the unbalanced force may oppose the gravitational forces acting on the machine. The unbalanced force may be sufficiently great to actually lift the machine from its supporting surface, and may produce a violent movement colloquially referred to as "walking."

Many solutions have been offered to this problem, including limiting the spin speed of the cylinder so that unbalanced loads do not produce a sufficient amount of centrifugal force to bodily lift the machine from its support. As well, control means have been proposed to deactivate the spin mechanism to allow the load to tumble and be redistributed in the cylinder in response to excessive motion in the apparatus, and in this arrangement the final spin speed is limited to a value such that the total amount of liquid centrifugally extracted from the contents of the drum or cylinder is much less than is desired. This naturally requires that all such extra retained liquid be evaporated by a longer line drying time or by consumption of an additional supply of input heat energy with a longer drying period, if the goods are machine-dried.

A further answer which has been offered to the unbalance problem is to suspend the entire laundry machine along with an additional mass producing dead weight within an enclosing cabinet on a complex spring system. It is inevitable in this arrangement that the size of the enclosing cabinet be greatly increased to allow for the violent gyratory motions of such a system during operation of the machine at high extraction speeds with an unbalanced load in the cylinder. Additionally, it has been suggested to sense and locate eccentric motions of the rotating body by costly relatively complex mechanisms which control the addition or subtraction of weights from the rotating components of the machine, to thereby counteract the unsymmetrically disposed centrifugal forces generated by the unbalanced condition within the cylinder or drum.

Each of the named disadvantages of the earlier arrangements is eliminated by the fluid balancing system with which the instant acceleration control system is associated. In this balancing system, a drum is journaled for rotation on a horizontal axis within a casing rigidly connected to a base frame. Vibratory movements of the casing are mechanically sensed by a rollable pin which converts the vibratory oscillations of the casing into angular displacements of the rollable pin. Such angular displacements are amplified mechanically through a lever arm connected to the pin, and the resulting pivotal movements of the lever arm, which is also referred to as an interrupter, deflector member or flag, are used to control the introduction of counterbalancing liquid into certain of a plurality of liquid balance pockets disposed on the periphery of the drum. In this manner, the situs of the unbalance is automatically determined, and only as much counterbalancing liquid as is required to substantially reduce the vibratory oscillations of the casing is added to the rotating system of the machine.

The acceleration control system of this invention, on the other hand, features a variable speed transmission interconnecting the drum with a drive motor, and the transmission has a low speed ratio for tumbling fabrics at a lower washing speed, an intermediate speed ratio for rotating the drum at a low spin speed, and a high speed ratio to permit drum rotation at higher extracting speeds for extracting fluids from the fabrics in the drum. As a part of the novel transmission of this invention, there is included a pneumatic friction clutch effective to change or shift the transmission from its low to intermediate or high speed ratios. The pneumatic friction clutch is connected to a solenoid operated air valve which in turn is connected to sensing means responsive to movements of the drum due to rotation of unbalanced loads therein at the intermediate and high speed ratios, so that the friction clutch slips when an unbalanced load is sensed to maintain the speed ratio of the transmission at a value between the low and high speed ratios to thereby limit rotation of the drum to a safe optimum speed above the tumble speed. In this manner, the drum speed is maintained during the water balance function at approximately the speed that produced sufficient centrifugal force from the rotation of the acentric load in the drum to produce the necessary deflection to initiate water balancing in addition to bleeding off the air pressure on the pneumatic clutch. As the off-balance load is counterbalanced, the deflection decreases with the result that the pneumatic clutch receives uninterrupted full pressure, and acceleration again continues.

It is accordingly an important aim of the present invention to provide acceleration control apparatus for a rotating receptacle.

Another object of this invention is to provide an acceleration control system for use with counterbalance control means and which does not interfere with the proper functioning thereof.

Still another object of the present invention lies in the provision of a system embodying variable speed transmission means, clutch means and sensing means, and wherein the structure is so constituted that the sensing means detects vibratory movements of a rotating receptacle which are greater than the vibrations which initiate performance of load balancing functions, the sensing means through a suitable valving arrangement being in control of the clutch means to limit the transmission speed ratio so that the receptacle rotates at a safe optimum speed which is sufficiently high so that there is normally no impedance of the load balancing function.

A further object of the present invention lies in the provision of a variable speed transmission having a pair of output shafts, gear means on said shafts so that one of said shafts may be driven at at least three different speeds, and clutch means mounted on the other of said output shafts and responsive to forces applied thereagainst to shift the transmission from low to intermediate or high speed.

Other objects and advantages of the invention will become more apparent during the course of the following description, particularly when taken in connection with the accompanying drawings.

In the drawings, wherein like numerals designate like parts throughout the same.

Reference will first be made in the following description to certain structural details of an exemplary form of combination washer-dryer, and to an illustrative type of water balance system used therewith. However, it will be readily appreciated that the acceleration control system of this invention is not restricted in its use to the particular structural organizaiton shown in FIGURES 1 and 2, nor do its advantages flow only from use with the particular liquid balance system also appearing in FIGURES 3 and 4. As well, it will be observed as the description proceeds that parts not necessary to a description of the instant acceleration control system have been removed in the interests of clarity.

Figure 1:
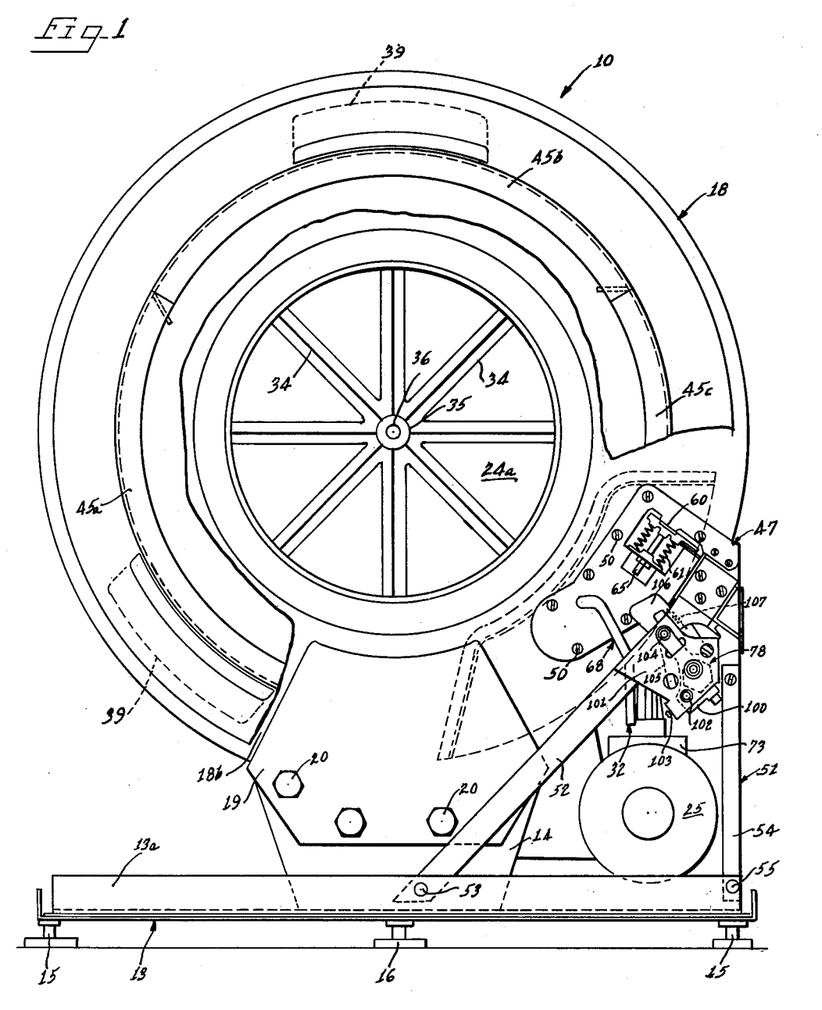
FIGURE 1 is a front elevational view of a laundry machine incorporating the principles of the present invention, but with the outer cabinet removed and with parts broken away and with other parts removed for clarity.
Figure 2:
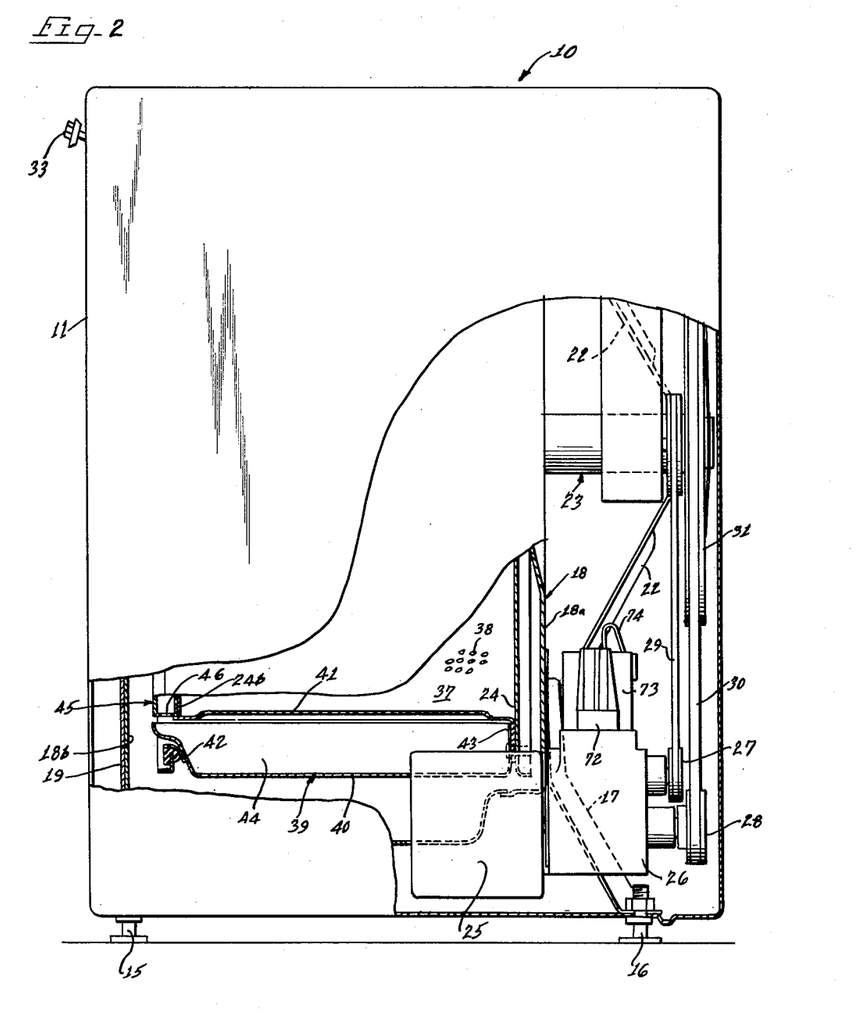
FIGURE 2 is a side elevational view of the machine of FIGURE 1, with portions of the cabinet structure removed for clarity of illustration.

As appears in FIGURES 1 and 2, a domestic laundry appliance in the form of a combination washer-dryer is designated generally by the numeral 10, and comprises an outer cabinet 11 providing an aesthetically appealing enclosure for the machine 10. In the manner conventional in the art, access to a treatment zone formed within the machine 10 is obtained through a suitable opening in the outer cabinet front wall, this front opening being closed by an access door (not shown) during the laundering operation.

Within the outer cabinet 11 is a rigid base structure shown generally at 13, and which comprises a channel member 13a to which is fixedly secured a plate 14. The base structure or frame 13 further may be observed from FIGURES 1 and 2 to include front legs 15 bolted to the channel member 13a, and a single rear leg 16 bolted to member 17 which is welded or otherwise secured to rear wall 18a of a generally imperforate outer casing 18.

The casing 18 is connected to and supported on the base frame 13 by a front support plate member 19 which is integrated with a front wall 18b of the casing 18 by welding or similar techniques. The plate member 19 is further securely fastened to the plate member 14 of the base frame 13, as by bolt means or the like 20.

The rear wall 18a of the casing 18 has a centrally apertured embossed portion 21 cooperable with a support spider 22 connected in firm assembly with the rear wall 18a to rigidly mount a bearing assembly generally designated at 23 in which is journaled shaft means 36 connected for corotation with a perforate drum or cylinder 24 rotatable within the casing 18.

It is to be noted that the connections provided by the parts 14 and 19 between the base frame 13 and casing 18 are rigid connections, however, there is sufficient yieldability in such connections so that some very small movement of the casing 18 relative to the base frame 13 may occur. The connections afforded by the connection of the plate members 14 and 19 to the channel member 13a and the connection of the part 17 to the casing 18 are sufficiently rigid to confine the casing 18 for oscillatory movements about an axis positioned parallel to and located below the horizontal rotational axis of the drum 24 prescribed by the connecting shaft means. In the machine exemplified in the drawings, such allowable arcuate movement is approximately 0.010 inch on each side of its normal centered position as measured from an approximate 16 inch lever arm.

The machine 10 is equipped with an electric drive motor 25 mounted (not shown) on the casing 18 and having a power take-off shaft drivingly connected with a transmission shown generally at 26 and the features of which will be later described in more specific detail. The transmission 26, which is also mounted (not shown) on the casing 18, has a pair of generally parallel output shafts 26a and 26b (FIGURE 7) mounting pulleys 27 and 28. The pulley 27 has trained thereabout a pulley belt 29 which connects with blower means and pump means (not shown). The pulley 28, on the other hand, is wrapped by a pulley belt 30 driving a pulley wheel 31 to rotate the drum 24 at one of three variable speeds provided by the transmission means 26.

The machine 10 is further equipped with the conventional mixing valve arrangement as well as a sump connecting with pump means and valve means (all not shown) desirably providing conduit means at least one of which leads to drain and another to a connection generally designated in FIGURE 1 at 32 providing a fluid supply for the balancing system of the machine 10.

It will be understood that the machine 10 has a sequential control means shown generally at 33 which is presettable by the operator and which is associated with the usual electrical circuitry with all of the operating components of the machine, including the electric drive motor 25, transmission means 26, the various valve means employed, and particularly solenoid valve means to be later described in detail which is in control of the pneumatic clutch means forming a part of the transmission 26. The sequential control means 33 by the various electrical connections conventionally employed actuates the machine through a program consisting of washing, rinsing, extracting and drying periods. In a typical operation, the operator will load a batch of clothes to be laundered through the access door into the drum 24, and upon initiation of a preselected program, the casing 18 will be charged with a supply of water. Following the washing operation, the laundry liquid will be drained through the sump and discharged to drain, and the materials within the drum 24 are then subjected to an extraction operation, followed by rinsing and a subsequent extraction operation, which portions of the washing cycle may be repeated as often as may be desired in accordance with the preset program. After the final extraction operation, the machine either continues through a drying period involving operation of the drying system and including the addition of heat of vaporization to the stream of ventilating air circulated through the treatment zone, or the batch of materials being laundered may be removed from the machine by the operator for line drying.

As earlier indicated, the acceleration control system of this invention may be employed in connection with various types of water balance systems, however, one particularly advantageous balance system is shown in the application drawings in order to clearly illustrate the numerous novel results obtained by the instant acceleration control system. In this connection, it is to be observed from FIGURE 1 that the drum 24 has formed along its back wall 24a a plurality of radially extending and angularly spaced strengthening ribs 34. At the center of the back wall 24a, the drum 24 is connected as at 35 to shaft means 36 journaled in the bearing assembly 23. The outer peripheral wall of the drum 24 is formed by a foraminous wrapper 37 and is particularly characterized by a plurality of openings 38 through which liquid may escape from the interior of the drum 24 into the casing 18. The drum periphery is further provided at a plurality of circumferentially spaced locations therealong with recess means provided to accommodate mounting therein of a liquid balancing receptacle indicated generally in FIGURE 2 at 39. Each receptacle 39 comprises a generally trough-shaped tray member having radially spaced walls 40 and 41, axially spaced end walls 42 and 43 and a pair of spaced side walls 44. Each receptacle 39 is provided with an inlet segment 45a, 45b and 45c which may be seen to be of generally U-shaped configuration and each provided with an opening 46 through wihch all of the fluid within the inlet segment is discharged radially outwardly into a particular respective receptacle as required for counter-balancing purposes. In the exemplary disclosure illustrated, there are three receptacles 39, and accordingly, each segment 45a–c may, if desired, extend through 120° of arc on the front wall of the drum 24. The inlet segments are attached in firm assembly as by welding or the like to the drum front wall in register with the liquid supply means 68 provided to introduce balancing fluid thereinto.

In order to control the introduction of balancing fluid into the receptacles 39 by way of the inlet segments 45a–c, there is desirably utilized as a controlling variable a mechanical signal manifested as a relatively small linear movement between the casing 18 and a relatively stationary reference means. As appears in FIGURES 1 and 3, a balance and nozzle housing 47 is provided with an aperture 48 forming an upper wall 49 constituting a surface portion movable in unison with the casing 18. Fastening means 50 may be employed to secure the balance and nozzle housing 47 to the front wall 18b of the casing 18.

In order to provide a relatively stationary reference with respect to the housing 47, there is utilized a subframe 51 (FIGURES 1 and 3) including an oblique leg 52 fastened in firm assembly with the base frame 13 at 53, as well as a vertical leg 54 secured to the base frame at 55. The reference means may be seen from FIGURE 3 to further include a slide member 56 fastened to the A-shaped subframe 51 as at 57, the slide member 56 having an arm 58 to which is connected a slide block 59 having a hardened surface confronting the wall 49 of the balance and nozzle housing 47, and closely spaced and in parallel relation thereto.

Figure 3:
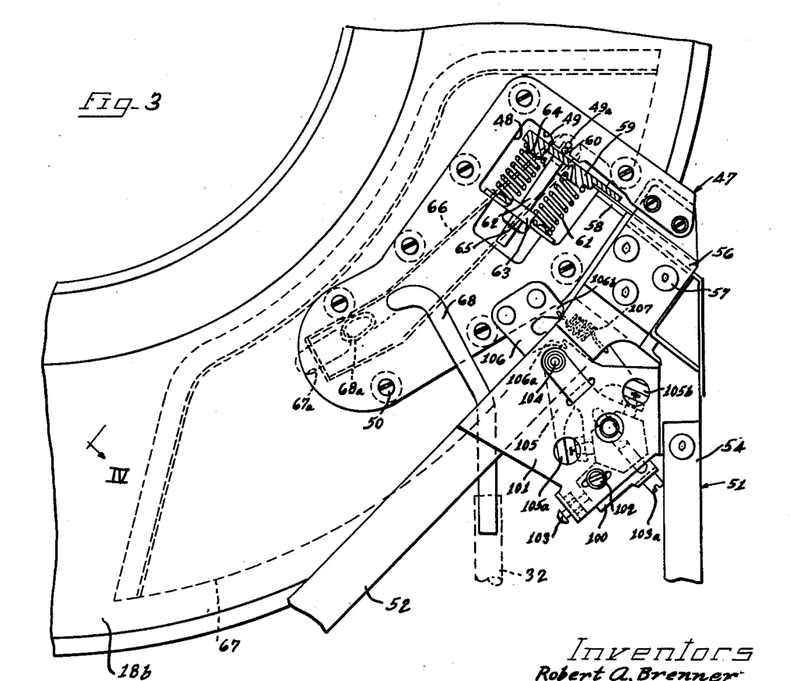
FIGURE 3 is an enlarged fragmentary view constituting a layout of sensing mechanisms which may be employed to initiate the transmission speed ratio limiting function and the load counterbalancing function.

For the purpose of sensing oscillatory movements of the casing 18 which are produced as a function of any unbalance manifested within the rotating drum 24, there is desirably utilized a sensing member in the form of a rollable pin 60 confined between the surfaces 49 and 59. Although not shown in specific detail, the surface 49 is particularly characterized by a niche or grooved slot which has width slightly larger than the outer diameter of the rollable pin 60 to provide the necessary clearance. If desired, the mentioned slot may receive therein a hardened insert 49a to present a surface for engagement against the peripheral surface of the pin 60. As is believed now quite apparent, the curved surface of the pin 60 is on a fixed radius with respect to the centerline axis of the pin and, therefore, the relative linear movement produced between the surfaces 49 and 59 is converted by the sensing member or pin 60 into angular movements about the pivot axis of the pin by the rolling action of said pin between the relatively moving surfaces 59 and 49.

In order to assure that the pin 60 is tightly confined between the surfaces 49 and 59, a plurality of spring means 61 are confined by bolt means 62 and a nut 65 extending between a bottoming plate 63 and embossments 64 on the slide member 59.

The angular movements of the pin 60 are amplified through a moment arm provided by an interrupter or flag member 66 connected in firm assembly with one end of the pin 60. The connection may be accomplished by welding the pin to the interrupter member, and it may be observed (FIGURE 4) that this member extends generally parallel to the front wall 18b of the casing 18 and is closely spaced to a splash housing 67 mounted on the inside surface of the front wall 18b between the casing 18 and drum or cylinder 24. The splash housing 67 has formed therein a slotted opening 67a and mounted in register therewith is a nozzle member 68 connecting with the conduit 32, and particularly characterized by a narrow elongated nozzle outlet 68a in discharging register with the slotted opening 67a in the splash housing 67.

Figure 4:
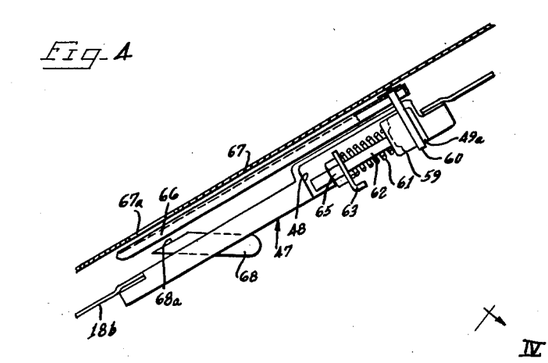
FIGURE 4 is a cross-sectional view taken substantially along the line IV—IV of FIGURE 3, but with parts removed in order to show additional details of construction of the water balance sensing mechanism of FIGURE 3.

Both the nozzle discharge outlet 68a and the slotted opening 67a are located directly adjacent to the arcuate path of movement of the interrupter member 66. Accordingly, the movements of the casing produced as a function of any unsymmetrically disposed load in the rotating drum 24 are sensed in a linear motion of the surfaces 49 and 59, whereupon the rolling pin 60, which is forcefully and resiliently squeezed between a portion of the front of the casing 18 and the vertical stationary extension of the base frame 13, will convert such movements into angular displacement. The rolling pin 60 provides a pivotal axis for the water deflector member or interruptor flag 66, which is normally positioned in the path of a fluid stream discharged through the nozzle outlet 68a during extraction operations. The deflection means provided by the interrupter member 66, which is located within the casing 18 on the rear side of the casing front wall 18b and spaced from both the casing front wall and the splash housing 67, will serve to deflect and direct the stream emanating from the nozzle outlet 68a downwardly in the splash housing 67 for return to the casing 18. The opening 67a in the splash housing 67, as well as the nozzle opening 68a, are aligned with the three inlet segments 45a–c carried on the front of the drum 24.

In operation, the movements of the casing 18, due to the rotation of unbalanced loads within the drum, cause a pivotal movement of the interrupter member 66 away from the fluid stream emanating from the nozzle opening 68a so that the fluid may be injected directly into an appropriate inlet segment for passage to the correct fluid-receiving pocket or compartment provided by a corresponding receptacle 39 on the drum 24 for automatically counteracting the unbalanced load causing the arcuate movement of the casing.

As was earlier stated, the described water balance system is illustrative of a typical arrangement which can be employed in conjunction with the acceleration control system of this invention. During the course of the following description, which is directed particularly to a novel three speed transmission used in conjunction with a new and improved system for controlling drum acceleration in response to deflections of the cylinder or drum structure relative to stationary base structure, it will be readily apparent that other types of water balance systems can be effectively utilized.

Briefly stated, in the acceleration control system of this invention a double acting bleed off or relief valve is mounted on the stationary A-frame structure 51 to sense vibrations caused by rotation of an unbalanced load in the drum 24. The valve connects with an outlet port of a solenoid operated air valve means and is constructed to provide a pressure bleed off line between an air compressor and the pneumatic clutch means in the transmission 26. An air compressor mounted on the transmission means and driven thereby communicates air to an inlet port in the solenoid valve means, and the solenoid is energized to cause the drum 24 to accelerate from low to intermediate to high speed by pressurizing a chamber within the solenoid valve means leading to the pneumatic clutch. A high speed spin solenoid is also energized to cause the machine to go into the high spin speed portion of the cycle, and when an off-balance load is accelerated and produces a deflection, the bleed off valve on the stationary A-frame is intermittently opened to reduce the pressure in the solenoid valve chamber. This has the effect of reducing the supply pressure to the pneumatic clutch in the transmission means, causing the clutch to intermittently slip to prevent increased drum acceleration until the off-balance load is counterbalanced. However, and as will be pointed out in detail hereinafter, the drum rotative speed is not reduced, but is maintained at essentially the speed which causes the casing deflections so that there is no interference with accomplishment of the proper water balancing function.

Figures 5, 8:
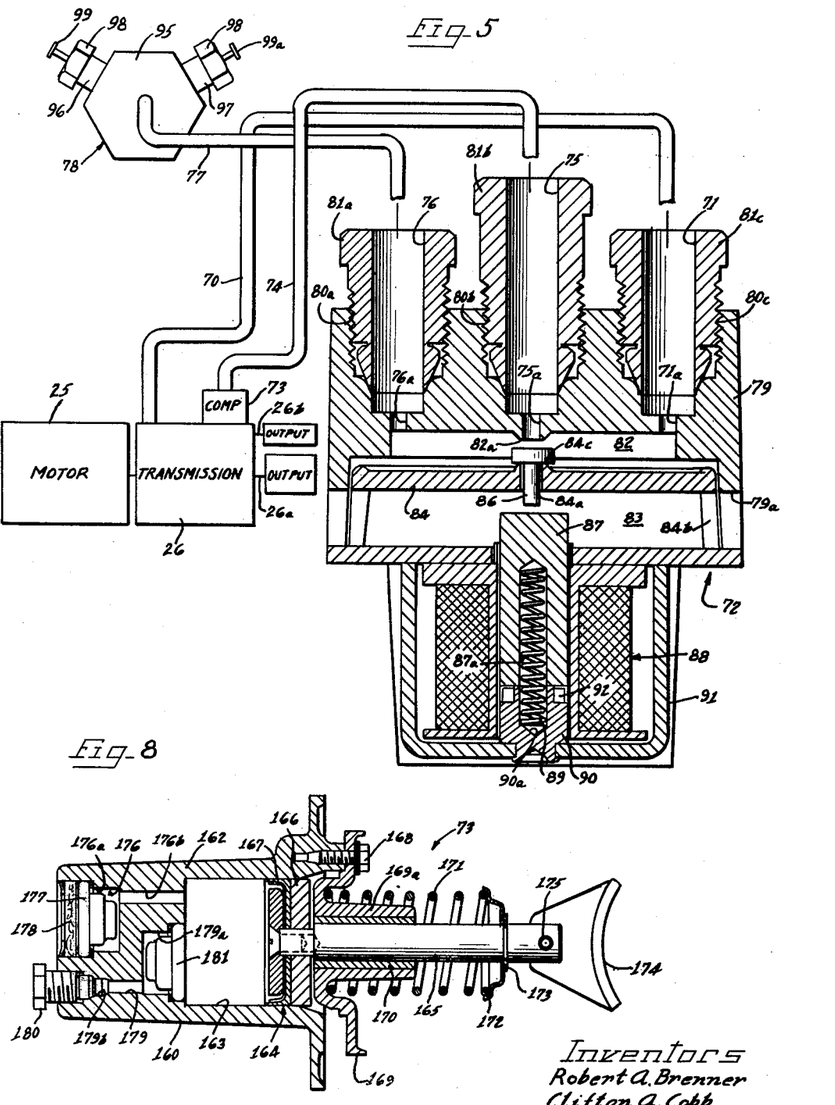
FIGURE 5 is a more or less diagrammatic view, with portions thereof taken in section, showing an acceleration control system embodying the novel concepts of this invention.
FIGURE 8 is a detail sectional view of compressor means which may be employed to supply air pressures to the pneumatic clutch of the transmission means of FIGURES 6 and 7.

The acceleration control system of this invention is more or less diagrammatically illustrated in FIGURE 5, and it may be seen therefrom that the drive motor 25 connects with the transmission means 26 having output shafts 26a and 26b mounting pulleys 27 and 28 constituting the output of FIGURE 5. The structural details of the transmission means 26 will be later described, and for the present purposes it may be noted from FIGURE 5 that conduit means 70 is in communication with the transmission means (specifically to a clutch actuating air cylinder therein which will also be later described), and with an outlet port 71 of solenoid operated air valve means generally designated by the numeral 72. A compressor 73, the details of which will be later described in connection with FIGURES 8 and 9, connects through its outlet port with conduit means 74 leading to an inlet port 75 of the solenoid valve means 72. The solenoid valve means is further provided with a second outlet port 76 which communicates through conduit means 77 which with a double acting bleed off or relief valve means designated generally by the numeral 78.

The solenoid valve means 72 is provided with a body portion 79 having at one end thereof a plurality of threaded openings 80a, 80b and 80c receiving coupling members 81a, 81b and 81c, respectively, which are internally bored to provide the outlet port 76, inlet port 75 and outlet port 71.

The body portion 79 of the solenoid valve means 72 is shaped interiorly to provide a chamber 82 communicating with the ports 76, 75 and 71 through reduced diameter passages 76a, 75a and 71a. The chamber 82 communicates with a chamber 83 through a central aperture 84a in a rigid diaphragm member 84, which is further provided with vent passages 84b leading through vent passages 79a in the body portion 79 to atmosphere.

The central aperture 84a in the rigid diaphragm member 84 receives a generally T-shaped flat surfaced valve member 86 positioned for contact with a solenoid armature 87 when solenoid 88 is de-energized. It may be noted from FIGURE 5 that the solenoid armature 87 has a central axial passage 87a and bottoming at one end thereof is spring means 89 which also bottoms against a fixed plug member 90 having a passage 90a therein. The plug member 90 may be secured in any suitable manner to a solenoid housing 91, and if desired, seal means 92 may be located between the solenoid armature 87 and plug member 90.

The energization of the solenoid 88 of the solenoid operated valve means 72 controls the shifting of the three speed transmission 26 from low to intermediate speed. When the solenoid is de-energized, the spring loaded solenoid armature 87 (shown energized in FIGURE 5) assumes its uppermost position which forces the valve member 86 against surface 82a, which in turn permits cavity or chamber 82 to be vented to atmosphere through the vents or passages 84a, 84b and 79a in the rigid diaphragm 84 and body portion 79, respectively. This prevents the increased air pressure from the compressor 73 from reaching the pneumatically operated clutch in the transmission 26. In addition, this action blocks the inlet passage 75a to the chamber 82, and the compressor 73 can thereby build up pressure until its relief valve means bleeds off the excess pressure.

When it is desired to shift the transmission 26 from low to intermediate speeds, the solenoid 88 is energized and of course remains energized when the transmission shifts from intermediate to high speeds. Energization of the solenoid 88 is accomplished through suitable electrical circuitry connected to the presettable timer means 33, and when the solenoid is energized the armature 87 thereof withdraws against the pressure spring means 89 to essentially the position of FIGURE 5. The air pressure from the inlet port 75, coupled with gravitational forces, moves the valve member 86 to a seating position upon surface 84c of the rigid diaphragm member 84. This blocks communication between the valve chambers 82 and 83, and pressurizes both of the valve outlets 71 and 76. The outlet port 71 leads to the pneumatic clutch in the transmission 26, causing this clutch to operate the transmission through suitable gear means and spring clutch means to shift to intermediate speed. The outlet 76 of the valve means 72 connects to the bleed-off valve 78, and as an off-balance load is accelerated and produces a deflection, the bleed-off valve is intermittently opened to cause a reduction of the air pressure in the chamber 82. The reduced air pressure acting upon the pneumatic clutch causes clutch slippage and a termination of increased drum acceleration, until the off-balance load is counterbalanced.

As appears in FIGURES 3 and 5, the double acting relief valve means is constructed to provide a body portion 95 having outlet portions 96 and 97 threadably receiving collar portions 98 in each of which travels valve core stems 99 and 99a. The valve body portion 95 is mounted on support means 100 (FIGURE 3) carried by a plate portion 101 welded or otherwise firmly secured to the brace members 52 and 54 of the A-frame 51. The angular position of the support means 100 relative to the plate member 101 may be adjusted by screw means 102 and 103. The body portion 95 of the air valve means 78 may be adjusted linearly with respect to support means 100 by means of screws 102a and 103a.

The plate member 101 mounts a pivot pin 104 receiving the adjustable support means 100, as well as a yoke member 105 having arm portions 105a and 105b relatively closely spaced from the valve core stems 99 and 99a.

As appears in FIGURE 3, the nozzle housing 47 rigidly mounts a lever member 106 having a claw portion 106a engageable with the yoke member 105 and an end portion 106b connected by a spring 107 to said yoke member. As is believed now apparent, when the support means 100 is properly adjusted in a static condition, the yoke arm portions 105a and 105b are spaced at substantially equal distances from the valve core stems 99 and 99a. When the tank and cylinder assembly starts to oscillate about its center of oscillation due to the acceleration of an off-balance load, the yoke member 105 will also oscillate about the pivot pin 104 driven by lever member 106. With the support means properly adjusted as stated and assuming deflection of the tank and cylinder assembly, the yoke arm portions 105a and 105b will depress the valve core stems 99 and 99a as the casing 18 oscillates with respect to the A-frame 51 to bleed off air pressure from the pneumatic clutch, terminating increased acceleration, although maintaining the drum speed relatively constant for effective water balancing.

The double acting valve assembly 78 is highly advantageous as contrasted with a single acting valve since it assures that air will be bled off if the machine 10 is moved, or if the support means 100 is not properly adjusted. In either of these circumstances, the distance between one of the yoke arm portions 105a and 105b and the adjacent valve stem 99 and 99a would be less than the desirable setting. If the machine 10 was then started up in the spin cycle with a severe off-balance load present in the drum or cylinder 24, the machine could not accelerate since it would have to bleed the air pressure from the pneumatic clutch on a smaller than normal movement in at least one direction of the tank and cylinder assembly. Accordingly, there would be prevented any possibility of the machine tipping or "walking" under these severe conditions. Of course, in order for the pneumatic clutch to again be properly actuated, the support means 100 and body portion 95 would necessarily have to be properly adjusted with respect to yoke member 105 to the static condition noted.

The positioning of the valve core stems 99 and 99a with respect to the yoke member arm portions 105a and 105b is controlled in relation to the position of the deflector or interrupter member 66 and its associated parts so that a slightly greater deflection of the tank and cylinder assembly is required to bleed off the necessary operating air pressure than is required to initiate the water balancing action. This is a mere matter of proper adjustment of parts and assures that the water balancing function will be first initiated and the acceleration control then set into action to maintain the transmission speed ratio at the speed which initially caused the off balance condition and initiated the counterbalancing action.

Figures 6, 9:
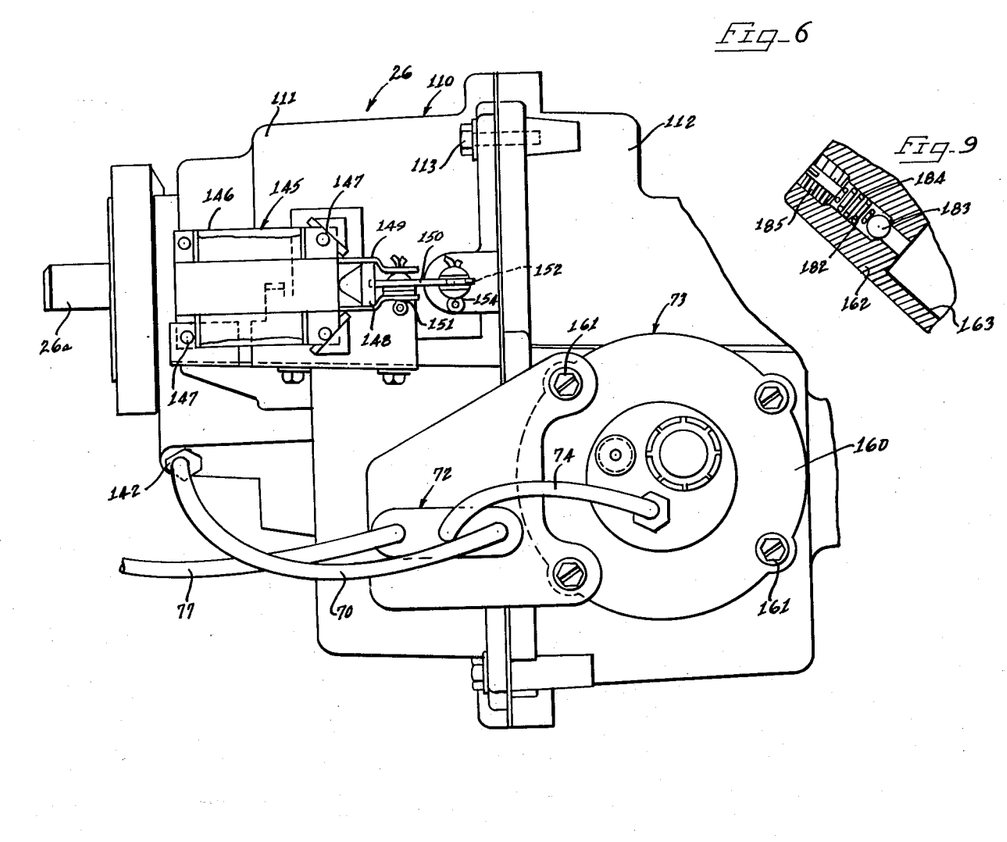
FIGURE 6 is a fragmentary top plan view of a variable speed transmission constructed in accordance with the principles of this inveniton.
FIGURE 9 is a fragmentary detail sectional view of the relief valve of the compressor of FIGURE 8.
Figure 7:
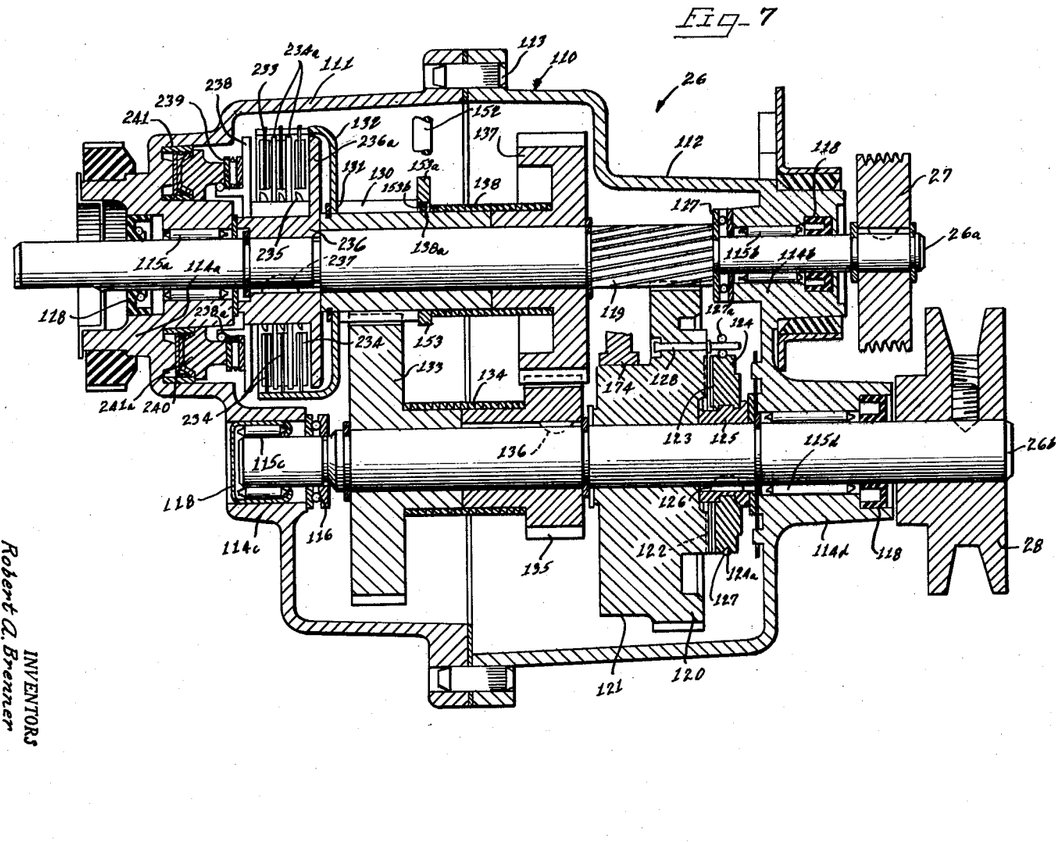
FIGURE 7 is a sectional view of the transmission means of this invention.

Referring now to FIGURES 6 and 7, the transmission means 26 is provided with a housing 110 comprising a pair of body portions 111 and 112 secured one to the other by fastening means 113. The body portions 111 and 112 are formed at opposite ends with apertured embossments 114a–d receiving bearing means 115a–d in which are journaled the shaft means 26a and 26b. The bearing means 115a–d may be of the needle type as shown, and desirably the shaft means 26a and 26b mount thrust bearings 116 and 117. As also appears in FIGURE 7, seal means 118 are normally provided at various locations along the axial length of the shaft means 26a and 26b.

The shaft means 26a and 26b are supported within the transmission housing 110 in the manner indicated in parallel alignment, and carried by the output shaft 26a or machined integral thereon is a low or tumble speed drive pinion gear 119 in meshing relation with a low speed driven gear 120 freely rotatable upon the output shaft 26b. The pinion 119 is constantly in meshing engagement with the driven gear 120 to drive said gear at constant speed. The driven gear 120 has formed thereon an eccentric cam surface 121 against which bears cam follower means 174 of the compressor 73, said follower means to be described in greater detail in connection with FIGURE 8. In this manner, the compressor 73 is also driven at a constant speed.

One face of the low or tumble speed driven gear 120 is formed with diametral slots or grooves 122 which mate with diametral raised ribs or protuberances 123 provided on one face of an internally threaded clutch drive plate 124 mounted on an externally threaded clutch plate mounting hub 125 fixedly secured to the output shaft 26b as at 126. The periphery of the clutch drive plate 124 is grooved as at 124a to frictionally mount a resilient spring wire loop member 127 one end of which is secured to pin means 128 secured to and extending axially through the driven gear 120.

The gear 120, clutch members 124 and 125 and spring member 127 function in the following manner. When the drive motor 25 flexibly coupled to the shaft means 26a is started and with air valve solenoid 88 deenergized, the low speed driven gear 120 and clutch plate 124 are normally slightly spaced with their engaging surfaces 122 and 123 separated. As the tumble speed driven gear 120 is driven from the tumble speed drive gear 119, the gear 120 initially overrides the stationary drum drive output shaft 26b. The spring member 127 wrapping the clutch plate 124 rotates with the gear means 120, and due largely to the friction between the clutch plate 124 and spring member 127, the clutch plate 124 rotates therewith and threads itself to the left in FIGURE 7 upon the threaded hub 125 which is keyed or otherwise secured to the shaft 26b. The threading action continues until the clutch plate means 124 is in clutching engagement by means of the slots 122 and protuberances 123 with the low speed driven gear 120, and at this time the output shaft 26b is driven at a speed that drives the drum or cylinder 24 at tumble or low speed through the externally threaded keyed hub 125.

To provide an intermediate speed (low spin speed rotation) for the drum or cylinder 24, the transmission means 26 is equipped with an intermediate speed drive gear 130 fixed at 131 to a clutch housing 132, which in turn is mounted for co-rotation with the shaft means 26a in a manner to be later noted. The intermediate speed drive gear 130 meshes with an intermediate speed driven gear 133 freely rotatable upon shaft means 26b, the gear means 133 being operatively connected through spring clutch means 134 with a high speed driven gear 135 keyed or otherwise secured as at 136 to the shaft 26b. The high speed gear 135 is driven by a high speed drive gear 137 freely supported upon the shaft 26a and operatively connected to the intermediate speed drive gear 130 by spring clutch means 138. The operation and function of the spring clutch means 134 and 138 will be shortly hereinafter described.

The clutch housing 132 is positively connected at 131 to the intermediate speed drive gear 130, as was noted. The clutch housing 132 is generally dish-shaped and connected thereto at 233 and axially but not angularly movable with respect to housing 132 are a plurality of clutch members 234 each spaced along their radially inwardly facing portions by return springs 235. Located in relatively closely spaced relation to one of the sets of clutch members or friction discs 234 is a radially extending flat portion 236a formed integrally with a friction clutch drive hub 236 keyed as at 237 to the motor shaft 26a. Mounted for axial movement on the hub 236 and between disc members 234 and spring members 235 are two additional disc members 234a that transfer power from the hub 236 to the clutch housing 132 when the pneumatic clutch is actuated. Spaced relatively closely to one of friction discs 234 is a clutch actuating member 238 mounted for axial movement upon the hub member 236. Clutch actuating member 238 is rotated by hub member 236.

The clutch actuating member 238 is generally annular and has formed thereon a collar portion 238a to provide a seating surface for thrust bearing means 239 against which acts an axially movable annular piston member 240 backed by diaphragm means 241. The housing body portion 111 is passaged as at 142 in FIGURE 6 to communicate the diaphragm chamber 241a through the conduit means 70 (FIGURE 5) leading to the solenoid operated valve means 72.

As the diaphragm member 241 expands by the admission of air pressures thereto, the piston member 240 and clutch actuating member 238 are moved axially until the actuating member 238 moves the adjacent set of friction discs or clutch members 234 against clutch discs 234a. Since the hub member 236 is fixedly secured to the shaft 26a and the friction discs 234 are connected to the clutch housing 132, which is in turn positively connected at 131 to the intermediate drive gear 130, the friction discs 234 when engaged by the clutch actuating member 238 and discs 234a rotate to co-rotate the intermediate drive gear 130, which is, as noted, freely rotatable upon the motor shaft 26a. The intermediate drive gear 130 will thereby drive the intermediate speed driven gear 133, which is also freely rotatable upon its shaft 26b. Since the intermediate speed driven gear 133 is now rotating at a greater rotative speed than the high speed driven gear 135, which is in turn keyed at 136 to its shaft 26b, the intermediate speed driven gear 133 will wind up the spring clutch means 134 so that the high speed driven gear 135 is driven from the intermediate speed driven gear 133 through said spring clutch means. Since the high speed driven gear is keyed to the shaft 26b, this shaft will be driven at an intermediate speed.

The intermediate spin speed is provided to lessen the torque requirements of the motor when accelerating the drum 24 above tumble speed. It is of special value during acceleration when the load changes from a condition where it is tumbling in the drum to a condition where the centrifugal forces on the load overcome the gravitational forces and the load assumes a position against the inner periphery of the drum.

At this point, the "multi-speed" output shaft 26b is rotating faster than the low or tumble speed driven gear 120. This overriding action relative movement causes the clutch plate 124 to unwind on the externally threaded tumble drive hub 125. The clutch plate 124 will thereby be threaded to the right away from contact with gear 120 in FIGURE 7 to a stop, and since the clutch plate speed exceeds the speed of the spring member 127 secured to the pin means 128 in the tumble speed driven gear 120, the friction forces exerted by the spring means 127 will produce no clutching action.

As was noted, expansion of the diaphragm means 241 and consequent axial movement of the clutch actuating member 238 is dependent upon the supply of sufficient air pressure to the diaphragm from the compressor 73 through the conduit means 74 to the solenoid operated valve means 72 and from said valve means through the conduit means 70 to the opening 142 in the housing portion 111 and to the diaphragm air chamber 241a. In this manner continued operation of the transmission 26 at an intermediate drive speed (low spin speed) is assured.

To accomplish a shift of the transmission from this intermediate drive speed (low spin or extraction speed) to high spin speed, the transmission housing 110 mounts a high speed solenoid designated at 145 in FIGURE 6. The solenoid 145 may comprise a housing 146 attached to the transmission body portion 111 by fastening means 147 and axially slidable within the housing is an armature 148 guided by a yoke member 149. Connected to the armature 148 is a generally triangularly shaped plate member 150 which pivots about the point 151 to raise and lower a rod or pin member 152 which in effect constitutes a right angle extension of armature 148 and depends downwardly through a suitable opening in the housing body portion 111. Pin member 152 is shown diagrammatically in a fragmentary view in FIGURE 7.

The rod-like or pin-like solenoid extension 152 is positioned for engagement with clutch release ring means designated in FIGURE 7 by the numeral 153. The clutch release means is formed with a radial tab or ear 153a thereon against which the solenoid extension 152 abuts when the high speed solenoid is de-energized, and radially inwardly of the tab 153a the inner diameter of the clutch release ring 153 is notched as at 153b to provide a pocket or recess for an axially directed tang 138a on the high speed spring clutch member 138.

By the construction described, when it is desired to shift the transmission to high speed from intermediate speed (low speed or extraction speed), which is the normal mode of operation, the high speed solenoid 145 is energized to move the solenoid armature 148 and pivot the plate member 150 about the point 151 which raises the rod-like extension 152 connected at 154 to the plate member. Raising of the solenoid extension 152 disengages said extension from the tab 153a on the clutch release ring 153, causing the intermediate speed drive gear 130, which is rotating faster than the high speed drive gear 137, to wind up the high speed spring clutch 138 around the hubs of each gear 130 and 137. The high speed drive gear 137 then drives the high speed driven gear 135, which as noted is keyed to the multi-speed output shaft 26b at 136. At this time, the high speed driven gear 135 is rotating at a greater speed than the intermediate speed driven gear 133, and accordingly, the intermediate speed spring clutch 134 is unwound.

It may now be observed that in order to shift the transmission 26 from intermediate drive speed to high speed, the high speed solenoid 145 must be energized, and as well, the diaphragm member 241 in control of the friction discs 234 must be pressurized. In this manner, should be drum and cylinder assembly vibrate due to rotation of the cylinder or drum 24 with an unbalanced load therein, such vibrations will intermittently depress the valve core stems 99 and 99a of the relief valve 78 to reduce the pressure in the solenoid operated air valve chamber 82. This has the effect of reducing the air pressure input to the pneumatic clutch diaphragm member 241, causing relative slippage between the clutch actuating member 238 and the friction discs 234 and 234a. The intermediate speed drive gear 130 accordingly is maintained at the speed at which the clutch slipping began, and since the high speed drive gear 137 is coupled thereto through the spring clutch 138, the high speed drive gear 137 drives the high speed driven gear 135 at a relatively constant but non-increasing rotative speed. By the transmission structure described, the cylinder rotation is maintained at that speed which caused the deflections associated with the unbalance condition so that the water balancing function can be accomplished, and yet the acceleration does not increase to create the possibility of the "walking" condition to which earlier reference was made. Likewise, when the unbalanced load is counterbalanced, and machine vibrations eliminaed, the relief valve is no longer actuated, normal pressures are restored to the diaphragm member and the speed ratio of the transmission continues its shift from intermediate to high speeds.

An exemplary form of compressor which may be used in the instant invention is shown in FIGURES 6, 8 and 9, and is designated therein generally by the numeral 73. The compressor comprises a cap portion 160 attached by fastening means 161 to the transmission body portion 112 along the upper surface thereof. Included in the annular cap member 160 is a compressor body portion 162. The body portion 162 is formed interiorly thereof with a piston chamber 163 slidably receiving a piston member generally designated at 164 and comprising a stem portion 165 to which is connected a head portion 166 threadably mounting a cap portion 167 that holds piston member 164 in place against the walls of the chamber 163.

Secured to the compressor housing 162 by fastening means 168 is a spring seat member 169 having a central neck portion 169a mounting a sleeve member 170 providing a piston stem receiving surface. The spring seat member 169 and particularly the neck portion 169a thereof is surrounded by spring means 171 seating at its opposite end against a spring seat member 172, shown as mounted in encircling relation upon the piston stem 165 and limited in its outward axial travel by retaining means 173.

Carried adjacent one end of the piston stem portion 165 is cam follower means 174 contoured for engagement with the cam surface 121 on the tumble speed driven gear 120 (FIGURE 7). The cam follower 174 is attached to the piston stem portion 165 at 175, and the transmission body portion 112 is of course apertured to permit the desired reciprocal action of the piston stem portion 165 and cam follower 174.

The compressor housing 162 is formed in the head portion thereof with three passages or openings. A first opening 176 provides an air inlet and may take the shape of a relatively large diameter portion 176a and a connecting reduced diameter portion 176b terminating at one end in the piston chamber. The relatively large diameter portion 176a of the inlet passage receives therein a spring loaded flat check valve assembly 177 of known construction backed on one face thereof by a filter element 178 to prevent the entrance of foreign substances.

A second passage or opening generally designated at 179 in FIGURE 8 provides an air discharge passage and is shaped to include a relatively large diameter portion 179a and a relatively slender portion 179b mounting a nipple member 180 for receiving the conduit means 74 of FIGURE 5. In the relative larger diameter passage portion 179a there is seated a spring loaded flat check valve assembly 181, which can be identical to the assembly 177, but located in a reverse position as shown.

The third passage in the compressor cylinder head or body portion 162 is shown in FIGURE 9 and is designated therein by the numeral 182. The passage 182 communicates at one end with atmosphere and at its opposite end with the piston chamber 163, and provides in the structure disclosed a relief valve opening. Within this opening there is received a ball member 183 backed by spring means 184 seated on its opposite surface against a threaded insert 185. Illustratively, the spring loaded ball check valve 183 opens at approximately 25 p.s.i., which exceeds pressures to be encountered during normal operation of the pneumatic system.

As is believed now apparent, travel of the cam follower 174 upon the cam surface 121 on the tumble speed driven gear 120 reciprocates the piston head portion 164 in opposite directions, and in its rearward stroke or in movement to the right as shown in FIGURE 8, the spring loaded check valve assembly 177 is forced open to permit the entrance of air to the piston chamber 163 during the suction stroke of the compressor piston. During the compression stroke or when the piston moves to the left in FIGURE 8, the spring loaded check valve assembly 181 opens to direct compressed air through the passage 179 to the conduit means 74 leading to the solenoid operated valve means 72. As was noted, the tumble speed driven gear 120 upon which the cam surface 121 is formed rotates at constant speed, and there is accordingly assured a constant output of pressurized air to the pneumatic clutch of the transmission means 26. In this connection, the spring loaded relief valve is effective to bleed off excess compressor pressure which builds up therein when the solenoid operated valve means 72 is de-energized.

The operation of the acceleration control system of this invention may be described as follows. To increase the cylinder speed of the machine from tumble to intermediate speed, the solenoid 88 in the solenoid valve means 72 is energized by the electrical circuitry in the machine. The solenoid 88 remains energized, of course, when the machine shifts from intermediate to high speed, and as is now believed apparent, energization of the solenoid 88 withdraws the solenoid armature 88 in opposition to the pressure of the spring 89 and to essentially the position of FIGURE 5. The air pressure from the compressor 73 entering the inlet port 75, in combination with gravitational forces, moves the valve member 86 against the surface 84c to block the passage 84a between the chambers 82 and 83. The valve outlet ports 71 and 76 are then pressurized, and as was noted, these ports lead through the conduit means 70 and 77 to the pneumatic cylinder diaphragm chamber 241a in the transmission 26 and the double acting relief valve 78, respectively.

Pressurization of the diaphragm member 241 in the transmission housing 110 moves the clutch actuating member 238 to the right in FIGURE 7, rotating the friction discs 234 and 234a and the clutch housing 132 connected thereto, the clutch housing also being connected to the intermediate speed drive gear 130 at 131. The intermediate speed drive gear 130 is of course freely rotatable on the motor shaft 26a, and as well, the intermediate speed driven gear 133 rotates freely on the output shaft 26b. The intermediate speed driven gear 133 accordingly overrides the shaft 26b, and since this gear is now rotating faster than the high speed driven gear 135, the intermediate speed spring clutch 134 is wound so that the high speed driven gear 135 is driven through the intermediate speed driven gear 133 through the spring clutch. By keying the gear means 135 to the shaft 26b at 136, the shaft 26b is driven in this manner at an intermediate speed.

Since the shaft 26b is now rotating faster than the tumble speed driven gear 120, an overriding action takes place which causes the clutch plate 124 to unwind on the hub 125 so that the engaging surfaces 122 and 123 on these parts are out of contact.

To shift the transmission 26 from intermediate to high speed, the high speed solenoid 145 is energized and the solenoid 88 of air valve 72 of course remains energized. Energization of the high speed solenoid withdraws the solenoid extension 152 from contact with the tab 153a on the clutch release ring 153, permitting the intermediate drive gear 130 to wind up the high speed spring clutch 138 about the hubs of each gear 130 and 137, since the intermediate drive gear 130 is rotating faster than the high speed drive gear 137. The latter gear then drives the high speed driven gear 135 which is keyed to the shaft 26b, and since the latter gear is rotating faster than the intermediate speed driven gear 133, the intermediate speed spring clutch 134 is unwound.

At any speed between tumble and high spin speed and when the cylinder 24 rotates with an unbalanced load therein, the deflections resulting in the drum and casing structure oscillate the yoke member 105 (FIGURE 3) about the pivot pin 104 to intermittently actuate the valve core stems 99 and 99a of the bleed off valve 78, which thereby reduces the pressure in the solenoid operated air valve chamber 82. A reduction of the pressure in this chamber lessens the presure applied against the diaphragm member 241 of the pneumatic clutch in the transmission means 26, causing the clutch actuating member 238 and discs 234a to slip relative to the friction discs 234. Through the gearing arrangement described, the rotative speed of the pulley 28 connecting with the cylinder 24 is varied, however, even through there is intermittent slippage in the pneumatic clutch herein provided, there is no marked speed reduction in the pulley 28 during clutch slippage. Rather, there is merely a termination of acceleration. Stated otherwise, the pulley 28 which drives the cylinder 24 rotates at essentially the speed which caused the off-balance condition, so that the counterbalancing action can continue at this speed. Of course, when counterbalancing is accomplished, the acceleration control system reverts to the condition originally described and acceleration toward high speed continues. Whenever during transmission operation the solenoid 88 is de-energized, spring 89 forces the valve member 86 against the surface 82a, which permits the chamber 82 to be vented through the passage 84a and through the vent openings 84b and 79a. In this manner the increased air pressure from the compressor 73 does not reach the pneumatic clutch, and since the inlet passage 75a is blocked, a build up of pressure occurs in the compressor 73 until the relief valve 133 therein opens.

As was earlier noted, the sensing components for the water balance system and for the acceleration control system are coordinated so that a relatively greater deflection is required to actuate the acceleration control system, than is needed to initiate the water balancing function. Of course an electrical sensing means could be used in substitution for the structure described hereinabove, and these and other modifications can be practiced without departing from the novel concepts of this invention.

The embodiments of the invention in which an exclusive property or privilege is claimed are defined as follows:

1. In a washing machine,
   a drive motor,
   a support,
   a rotary basket for receiving fabrics to be washed and centrifugally dried,
   means mounting said basket on said support for movement in response to vibrations produced by rotation of unbalanced loads in said basket at centrifuging speeds,
   a transmission interconnecting said drive motor and said basket and having a low speed ratio for tumbling said fabrics at a lower tumbling speed, a high speed ratio for rotating said basket at higher centrifuging speeds for extracting fluid from said fabrics, and a speed ratio intermediate said low and high speed ratios for rotating said basket at a lower centrifuging speed,
   clutch means for changing the speed ratios of said transmission,
   actuating means for said clutch means,
   pressure source means including conduit means directing pressurized fluid to said actuating means,
   and valve means connected to said support and mounted in said conduit means,
   actuator means connected to said basket mounting means and operable upon movement of said basket mounting means due to rotation of unbalanced loads above said low speed ratio for limiting the speed ratio of said transmission to a value generally between said low speed ratio and said high speed ratio to thereby effect the rotation of said basket at a safe optimum speed above said lower tumbling speed.

2. Laundry apparatus comprising,
   drive means,
   support means,
   a rotary basket for receiving fabrics to be washed and centrifugally dried,
   means mounting said basket on said support means to accommodate vibratory movements of said basket as produced by the rotation of acentric loads in said basket,
   a transmission interconnecting said drive means and said basket and having a low speed ratio for tumbling said fabrics at a lower tumbling speed, a high speed ratio for rotating said basket at higher centrifuging speeds for extracting fluid from said fabrics, and a speed ratio intermediate said low and high speed ratios for rotating said basket at a lower centrifuging speed,
   means providing a source of fluid pressure,
   fluid clutch means controlling the selection of said speed ratios,
   conduit means interconnecting said source of fluid pressure with said fluid clutch means,
   valve means in said conduit means,
   valve actuator means connected to said basket mounting means and actuated by vibratory movements of said basket to actuate said valve means for regulating the supply of pressure to the clutch means and thereby limiting the rotation of said basket to those speeds which produce only minimal basket vibrations of a predetermined amplitude,
   means for counterbalancing said acentric loads in said basket,
   and control means operatively connected between the basket mounting means and said support means and operatively engageable with said valve actuator means and said means for counterbalancing so that greater amplitudes of basket movement are required for actuation of said valve means than for said counterbalancing means.

3. Laundry apparatus, comprising,
   drive means,
   support means,
   a rotary basket for receiving fabrics to be washed and centrifugally dried,
   means mounting said basket on said support means to accommodate vibratory movements of said basket as produced by the rotation of acentric loads in said basket,
   transmission means interconnecting said drive means and said basket to provide a plurality of speed ratios and having a low speed ratio for tumbling said fabrics at a lower tumbling speed,
   a higher speed ratio for rotating said basket at higher centrifuging speeds for extracting fluids from said fabrics,
   and a speed ratio intermediate said low and higher speed ratios for rotating said basket at a lower centrifuging speed,
   a fluid compressor driven by said transmission means,
   fluid clutch means in said transmission means controlling the selection of said speed ratios,
   conduit means interconnecting said compressor and said fluid clutch means,
   and valve means in said conduit means mounted on said support means and having valve actuating means operatively engageable with said basket mounting means and actuated by vibratory movements of said basket relative to said support means for regulating the supply of fluid pressure to the clutch means and thereby limiting the rotation of said basket to those optimum speeds which produce only minimal basket vibrations of a predetermined amplitude.

4. In a washing machine,
   a drive motor,
   a support,
   a rotary basket for receiving fabrics to be washed and centrifugally dried,
   means mounting said basket on said support for movement in response to vibrations produced by rotation of unbalanced loads in said basket at centrifuging speeds,
   a three-speed transmission interconnecting said drive motor and said basket and having a low speed ratio for tumbling fabrics in said basket at a lower tumbling speed,
   a high speed ratio for rotating said basket at higher centrifuging speeds for extracting fluids from said fabrics, and a speed ratio intermediate said low and high speed ratios for rotating said basket at a lower centrifuging speed, clutch means for changing the speed ratios of said transmission, and a pressurized fluid-operated system in control of said clutch means and said transmission and comprising valve means mounted on said support, valve actuating means engageable with said basket mounting means for sensing movement of said basket mounting means relative to said support due to rotation of unbalanced loads at said high speed ratio, a fluid cylinder connected to said clutch means, and conduit means connecting said valve means and said cylinder to a source of pressurized fluid, said valve means being effective when an unbalanced load is rotated in said basket at a speed above said low speed ratio, and said basket mounting means is thereby in movement relative to said support, to engage said basket mounting means, thereby reducing the fluid pressure in said conduit means and through said clutch means actuating said transmission to limit the speed ratio to a value between said low and said high speed ratios, thereby effecting rotation of said basket at a safe optimum speed above said lower washing speed.

5. Laundry apparatus comprising, drive means, support means, a rotary basket for receiving fabrics to be washed and centrifugally dried, means mounting said basket on said mounting means to accommodate vabratory movements of said basket as produced by the rotation of acentric loads in said basket, transmission means interconnecting said drive means and said basket to provide a plurality of speed ratios for rotating said basket, said transmission means comprising a housing and first and second output shafts journaled in said housing, a first drive gear co-rotatably mounted on said first output shaft, a first driven gear freely supported upon said second output shaft and positioned in meshing relation with said first drive gear to produce a first speed ratio, a second drive gear freely supported upon said first output shaft, a second driven gear journaled on said second output shaft and meshing with said second drive gear to produce a second speed ratio, a third drive gear freely supported on said first output shaft, a third driven gear co-rotatably mounted on said second output shaft and located in meshing relation with said third drive gear to produce a third speed ratio, coupling means interconnecting said second drive gear to said third drive gear and said second driven gear to said third driven gear, said three speed ratios constituting a low speed ratio for tumbling fabrics in said basket, a high speed ratio for rotating said basket at higher centrifuging speeds for extracting fluids from said fabrics, and an intermediate speed ratio between said low and high speed ratios for rotating said basket at a lower centrifuging speed, a compressor driven by said transmission means, fluid clutch means in said transmission means controlling the selection of said speed ratios, conduit means interconnecting said compressor and said fluid clutch means, and valve means in said conduit means mounted on said support means and having valve actuating means operatively engageable with said basket mounting means and actuated by vibratory movements of said basket relative to said support means for regulating the supply of fluid pressure to the clutch means and thereby limiting the rotation of said basket to those optimum speeds which produce only minimal basket vibrations of a predetermined amplitude.

References Cited in the file of this patent

UNITED STATES PATENTS

| | | |
|---|---|---|
| 1,775,460 | Herrmann | Sept. 9, 1930 |
| 2,647,386 | Keiper | Aug. 4, 1953 |
| 2,760,639 | Haverstock | Aug. 28, 1956 |
| 2,920,496 | Forster | Jan. 12, 1960 |
| 2,950,009 | Bochan | Aug. 23, 1960 |
| 2,963,159 | Stone | Dec. 6, 1960 |
| 2,967,621 | Metzger | Jan. 10, 1961 |